June 2, 1936. M. B. MORGAN 2,043,006
DRIVING AXLE MECHANISM
Filed Feb. 7, 1934 3 Sheets-Sheet 1
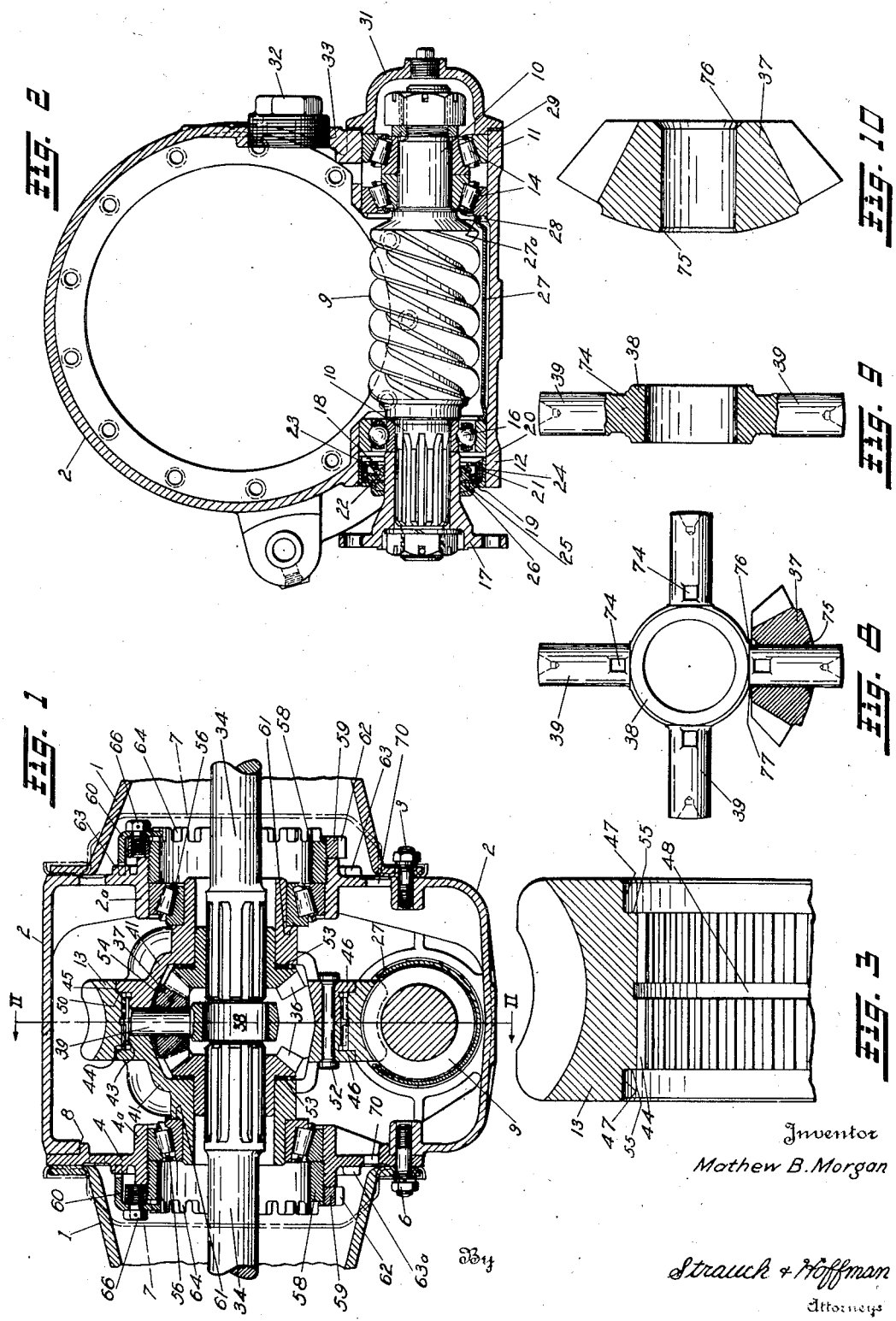
Inventor
Mathew B. Morgan
By Strauch & Hoffman
Attorneys June 2, 1936.  M. B. MORGAN  2,043,006
DRIVING AXLE MECHANISM
Filed Feb. 7, 1934    3 Sheets-Sheet 2

Inventor
Mathew B. Morgan
By Strauch & Hoffman
Attorneys

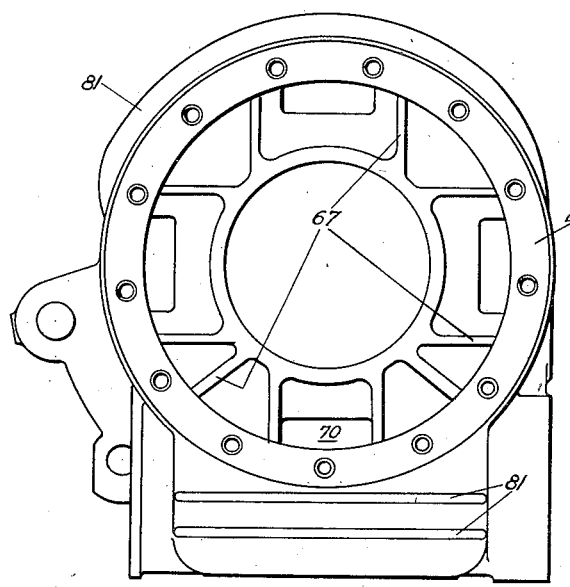
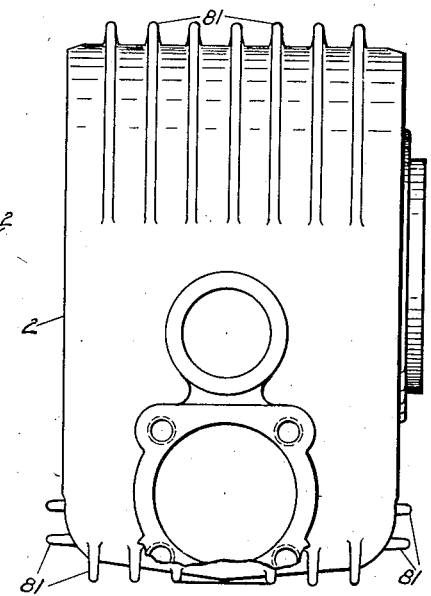
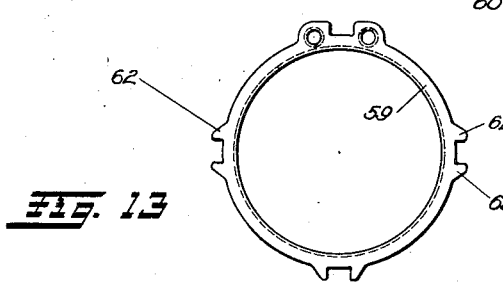
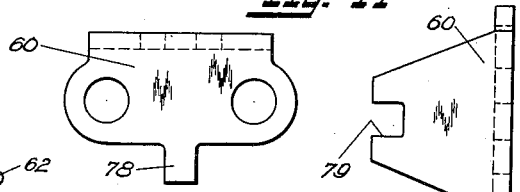
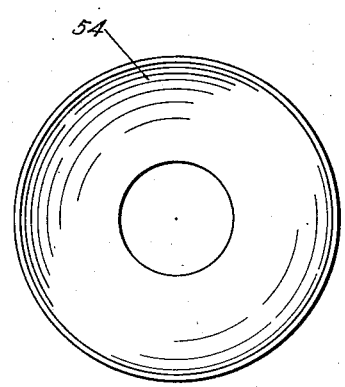
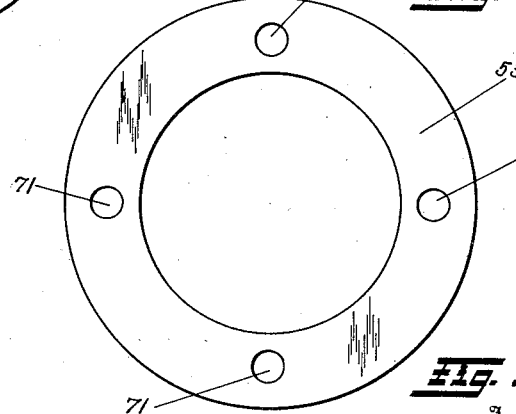

Patented June 2, 1936

2,043,006

UNITED STATES PATENT OFFICE 2,043,006

DRIVING AXLE MECHANISM

Mathew B. Morgan, Detroit, Mich., assignor to The Timken-Detroit Axle Company, Detroit, Mich., a corporation of Ohio Application February 7, 1934, Serial No. 710,169

14 Claims. (Cl. 74—311)

This invention relates to an axle mechanism adapted for use on motor vehicles. In certain respects, this application is a continuation in part of my co-pending case, Serial Number 565,433, filed September 28, 1931.

It is a primary object of this invention to provide an improved differential assembly unit.

It is also an object of this invention to provide an improved differential mechanism which will be light, yet compact and sturdy.

A further object of this invention is to provide an improved means for fixing a ring gear to a differential casing.

Another object of this invention is to provide an improved differential unit whereby the overall dimensions, for a given desired load capacity and torque multiplication, can be kept at a minimum without sacrifice of the necessary strength at any point in the differential unit.

It is another important object of this invention to provide a ring gear adapted to be fixed to a two-section differential casing, the ring gear having an annular recess opposite the juncture of the inner faces of the two sections and designed to receive any burrs or foreign particles which may remain on the differential casing splines, thereby insuring a contact between the opposite faces of the differential sections. This annular recess further serves to break up the machining operation and to reduce the wear on the cutting tool.

Another object of this invention is to provide an improved differential mechanism in which the several parts are so designed as to receive proper lubrication from a lubricant contained in the differential housing.

Still another object of this invention is to provide a differential casing of improved efficiency.

A further object of this invention is to provide an improved differential casing which will facilitate the lubrication of the differential mechanism.

Another object of this invention is to provide a differential housing which will radiate a maximum amount of heat from the moving parts of the differential.

A further object of this invention is to provide a novel locking arrangement for the differential bearing adjusting means.

This invention further resides in the improvement of the various arrangements and combination of parts to accomplish the above and other objects, which will readily appear from the accompanying description and drawings, in which:

Figure 1 is a vertical sectional view of an improved differential mechanism taken along the axis of the driven axle shafts, but with one of the pinions rotated slightly out of position for convenience and clarity of illustration.

Figure 2 is a vertical cross sectional view taken substantially along the line II—II in Figure 1, with the differential and left-hand carrier plate unit removed.

Figure 3 is an enlarged cross sectional view of a portion of the ring gear, showing the driving and piloting surfaces for engaging the differential casing.

Figure 8 is an enlarged side view of the differential spider showing the depressions in the arms for receiving oil and showing the cooperation of the differential pinion to form a small oil reservoir.

Figure 9 is a partial cross sectional view of Figure 8 on the axis of two arms of the spider.

Figure 10 is an enlarged cross sectional view of the differential pinion showing the chambers on the spider arm bore of the differential pinion.

Figure 11 is an enlarged plan view of a concave washer which is inserted between each differential pinion and the differential casing.

Figure 12 is an enlarged side view of a thrust washer for insertion between a gear and a side of the differential casing.

Figure 13 is a side view of the jamming ring nut for engaging the differential bearing adjusting ring.

Figure 14 is a vertical enlarged view of the lock member for the bearing adjusting means as shown in Figure 1, looking from right to left.

Figure 15 is a plan view of the lock member in the position shown in Figure 1.

Figures 16 and 17 are side and end views, respectively, of a modified form of differential housing having heat radiating ribs.

Figure 4:
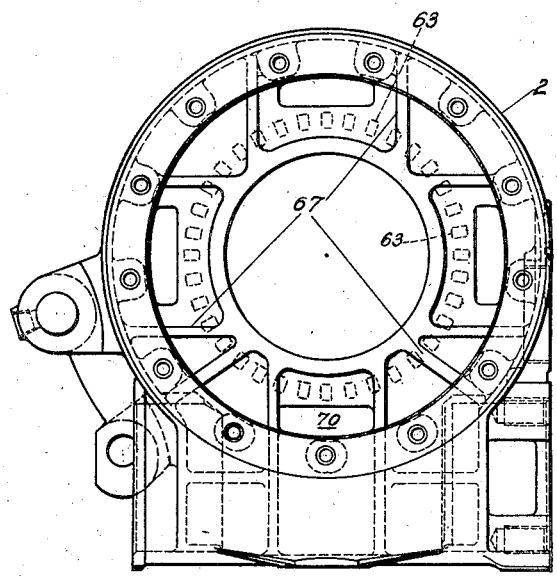
Figure 4 is a side view of the main differential housing looking from left to right in Figure 1 with the end plate removed.
Figure 5:
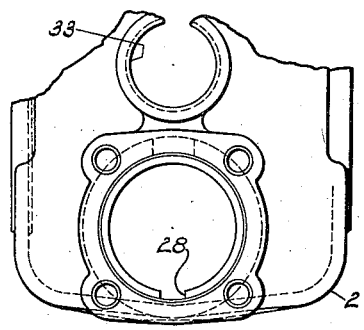
Figure 5 is a partial end view of the housing looking from right to left in Figure 4.

Referring to Figures 1 and 2, the driven axle shaft housings are indicated at 1. A main differential carrier housing 2 is secured to the right hand axle housing by means of stud and nut assemblies 3. The left hand differential carrier comprises an end plate 4 secured to the right hand carrier 2 by means of stud and nut assemblies 6. The stud and nut assemblies 6 also hold the left hand axle housing to the differential carrier 2.

In many instances it will be desirable to transport the housing and carriers, and the mechanism carried thereby, as a unit independently of the axle shafts and their housings. For this purpose, there is provided a pair of covers 7, adapted to be held against the sides of the housing by the stud and nut assemblies 3 and 6 to protect the internal mechanism when shipping.

The plate 4 closes an opening 8 in the main carrier 2 which is large enough to permit the removal of the differential mechanism including the ring gear. The end plate 4 has a ground fit with the housing 2 so that the differential bearing will be assured of proper alignment.

The construction of the differential housing in accordance with this invention greatly facilitates assembling and tearing down the entire mechanism. By providing the main housing with an end plate 4, which is secured to the main housing by the same bolts that hold one of the axle housings, a simpler assembly is possible.

A worm 9 has integral shaft extensions 10 journaled by means of anti-friction bearings in tubular tangential extensions 11 and 12 of the main housing and is adapted to mesh with a master gear in the form of a worm ring or wheel 13. The worm extensions 10 are journaled by means of thrust bearings 14 in the rear tangential extension 11 and by means of a ball bearing 16 in the extension 12. The forward worm extension 10 has longitudinal splines adapted to engage internal splines of a companion flange 17.

An oil seal assembly 18 is provided in the forward tubular extension to prevent leakage of oil around the companion flange 17. This seal comprises nested flanged rings 19 and 21 forming an annulus in which a treated flanged leather washer 22 is frictionally engaged. A washer 20 engaging the open end of ring 19 holds the members of the oil seal in assembled relation. A coil spring 23 resiliently presses the flange of the leather washer 22 against the companion flange hub. This oil seal is press-fitted into a cylindrical sleeve 24 having a radially inward extending flange 25. A felt washer 26 is held between the flange 25 and the oil seal 18 to exclude the entrance of water and dirt. The complete assembly is conveniently and snugly press-fitted into the forward housing extension 12.

A shroud or casing 27, which is broadly the subject of my patent 1,811,058, encloses the worm 9 and the engaging portion of the worm wheel 13. The shroud or casing 27 prevents the lubricant around the worm from being forced away from the meshing parts of the gears by the pumping action of the worm 9. The lip 27a engages a notch 28 in the extension 11 to hold the casing from being turned by the churning action of the oil.

The bearings 14 may be adjusted by means of circular shims 29 between the housing 2 and a bearing cap 31, which is centrally apertured to receive a pipe plug. Said aperture is for the purpose of testing the end play of the worm shaft 9. A plug 32 is provided for a hole 33 in the housing 2 through which a lubricant may be put into the housing. The hole may also be used as a peep-hole during assembly, or when adjusting the unit to obtain the proper tooth contact.

Driving axle shafts 34 have bevel gears 36 splined on their inner ends. Differential pinions 37 are carried on a spider 38, the outer portions of the arms 39 of which are engaged by two halves 41 of the differential casing. The worm ring 13 is non-rotatably fixed to the halves of the differential casing by means of a continuous series of fine shallow splines 43 on the casing engaging complemental internal splines 44 on the worm ring (Figure 3).

In the devices prior to my invention, splined connections have been used, but these prior devices either used very large splines or too widely spaced splines on only a portion of the periphery of the differential casing. In either instance, there is a large arc on the differential casing on which there is insufficient driving connection to the worm ring as well as no piloting surface to take the radial thrust on the worm ring. The reason for this weakened connection in prior devices was that means had to be provided for making a driving connection between the differential casing and the spider arms. Such interruptions cause high stresses to be set up in the worm ring, which is usually made of a relatively soft, anti-friction alloy, such as bronze, with a resultant tendency to deflect and break the latter.

In a worm drive for a differential, the outside diameter of the worm wheel is definitely limited by the speed reduction of the final drive and the road clearance, especially in an underslung worm drive. Consequently, the driving connection in such a differential mechanism becomes of great practical importance where the unit must be small and yet capable of transmitting relatively high torque. A splined driving connection must be provided which will be continuous. By continuous is meant that there is at least one, and preferably more than one, driving point corresponding to each tooth on the worm ring. Such a connection produces substantially only shearing stresses in the worm ring. Furthermore, a connection must be provided between the differential casing and the spider arms in such a way that the differential assembly will not be weakened at any point and yet will be compact.

It is to be noted that the differential may be considered as a lever arm which is effectively fulcrumed at the axis of the driving axle shafts 34. The point of application of the force is at the outer periphery of the worm ring 13. The weakest points in this lever are the points of engagement between the worm ring 13 and the differential casing and at the engagement of the differential pinions 37 and the driving axle gears 36. The driving connections between the differential casing and the spider arms, as proposed in the prior art, have not necessarily been weak in themselves, but they have been constructed in such manner that they have interrupted or weakened the driving connection between the worm ring and casing, with the further result that the worm ring also has been weakened at several points.

According to this invention, the continuous series of fine, shallow splines 43 and 44 form a driving connection through which the driving effort is transmitted in a straight line from the engagement of the worm 9 and worm ring 13 directly to the differential casing 41. Such an arrangement prevents any driving effort being transmitted circumferentially of the worm ring and consequently eliminates any tendency of the worm ring to buckle or distort in the plane of rotation. Where there are no interruptions of the driving connection adjacent the spider arms, more differential pinions may be used, without weakening the driving connection. The larger the number of the pinions used, the smaller each pinion may be made, of course, within practical limits, since the pressure on the teeth becomes less as their number increases. In the drawings, a four pinion differential is shown. In Figure 1, only one of these pinions is seen for purposes of clarity. At least four are preferable and it is to be understood that a greater number could be used. Smaller pinions allow a greater body of material in the differential casing between the splines and the differential gears and pinions, thus allowing through rivets (52) to be placed in the casing sections well within the root circle of the splines 43.

In a worm drive there are three main stresses set up in the worm ring under heavy load. At the point of engagement of the worm 9 and the worm ring 13, there is a lateral force exerted on the worm ring 13 due to the friction of the gears. Tension and compression stresses are set up in the circumference of the worm ring due to the torsional effort. Also under load the worm 9 and worm ring 13 tend to separate and exert a radial thrust on the worm ring.

The differential unit built in accordance with this invention provides reinforcing means for the worm ring 13 to resist all of these stresses.

The piloting flanges 46 on the casing sections 41, adjacent the splines 43, have continuous outer surfaces 45 engaging recesses 47 in the worm ring 13 to resist the radial thrust. There is a slight clearance between the roots of the splines and their complementary engaging surfaces so that all piloting of the worm ring is done by the flanges 46. The outer radial surfaces 50 on the flanges 46 engage the radial surfaces 55 of the recesses 47 in the worm ring 13 to resist all the lateral thrust. The surfaces 55 prevent the splines 44 from receiving any lateral thrust. As explained above, the driving torque is carried entirely by the splines 43 and 44 in such a manner that there is at least one spline on the casings 41 engaging one spline on the worm ring 13 for every tooth on the worm ring. This substantially eliminates any tension or compression in the circumference of the worm ring while the flanges 46 take the radial thrust leaving only shearing stresses in the worm ring. With the above construction, there is practically no distortion of the worm ring under heavy load.

By using four or more differential pinions 37, the size of the pinions may be reduced, allowing sufficient space inside of the differential casing to permit rivets 52 well within the root circle of the splines 43. By arranging the rivets inwardly of the root circle of the splines, the driving connection is not materially weakened or interrupted at any point.

It might appear at first glance that great effort has been made to strengthen a system at some points while leaving a weak structure at other points. While the splines on the worm ring are made of a comparatively soft alloy, such as bronze, they are located in the lever system where the shearing stresses are relatively small, due to their distance from the fulcrum. The differential pinions and driving axle gears are located nearer the fulcrum, but they can satisfactorily handle the load because the driving effort is equally distributed between them for transmission to the two driving axles 34. Due to the use of a four-pinion differential, there are at least six teeth in contact which are divided three to each side gear, with one-half of the load transmitted to each side. The splined connection between the driving axles 34 and the pinions 36 is still closer to the fulcrum, but the splines are steel in both cases and further their axial length may be increased to any convenient length to reduce the shearing stress.

An annular recess 48 is provided in the worm ring 13 adjacent the juncture of the two halves of the differential casing. The main object of this annular recess is to provide a trap in which foreign particles or any loose burrs, which might be left on the splines as the result of forming operations, are received when the casing is engaged by the worm ring.

If the recess were not provided, the particles would get between the adjacent abutting faces of the casing and hold them apart. It is to be noted here that the annular recess or groove may be cut in sections of the casing adjacent their abutting faces. The same object may be obtained by chambering the splines at the edges of the faces of the casing sections or by merely reducing the depth of the splines on the worm ring opposite the juncture of said casing sections. The groove or recess also permits the machining operation of the internal surface of the worm ring to be broken up, thereby reducing the wear on the cutting tool. Annular recesses 49 in the outer surface of the differential casing are for the purposes of machining and of receiving foreign substances.

Ribs 51 strengthen the differential casing halves 41 and prevent flexing under heavy load. These ribs also pick up lubricant and carry it to the differential mechanism. The differential casing halves are held snugly against the spider arms 39 by means of bolts or rivets 52, well inside of the splines on the casing sections.

Washers 53, made of a metal, such as bronze, that is softer than the pinions and differential casing, are provided between the differential casing and the bevel gears on the driving axle shafts. Likewise, concave washers 54, made of a similar material, are inserted between the differential pinions 37 and the differential casing 41. These washers greatly reduce the wear on the pinions and casing.

The differential casing is journaled in the differential carrier by means of anti-friction bearings 56. The right hand bearing is carried by a cylindrical projection 2a on the housing 2, while the left hand bearing is carried by a cylindrical projection 4a on the end plate 4. The bearings are adjusted by means of bearing adjusting rings 58. The rings 58 are screw threaded into the projections 2a and 4a and are adapted to hold the bearings 56 against shoulders 61 on the differential casing. When the bearings are properly adjusted jamming ring nuts 59, which have lugs 62 for the purpose of manipulation, are screwed on to the projecting portions of the bearing adjusting rings 58 and hold the nuts against rotation.

Locking members 60 engage a series of lugs 63 on the housing 2 and a series of lugs 64 on the adjusting rings 58, and are secured to the jamming nuts 59 by means of cap screws 66. The lugs 63a on the end plate 4 correspond to lugs 63 on the housing 2.

The lugs 63 on the housing are smaller and are of greater number than the lugs 64 on the adjusting rings 58. By making one set of lugs smaller than the other, there are a larger number of locking positions available at which the adjusting nut can be locked with respect to the housing 2.

This arrangement provides a very reliable locking device for a bearing adjusting unit which is capable of minute adjustment. The series of notches on the housing 2 are shown in broken lines in Figure 4. Ribs 67 on the inside of the housing 2 are for the purpose of making the housing more rigid. There are apertures 70 in the housing 2 and the end plate 4, some of which allow lubricant, which passes through bearings 56 to return to the lower part of housing 2.

Figures 6, 7:
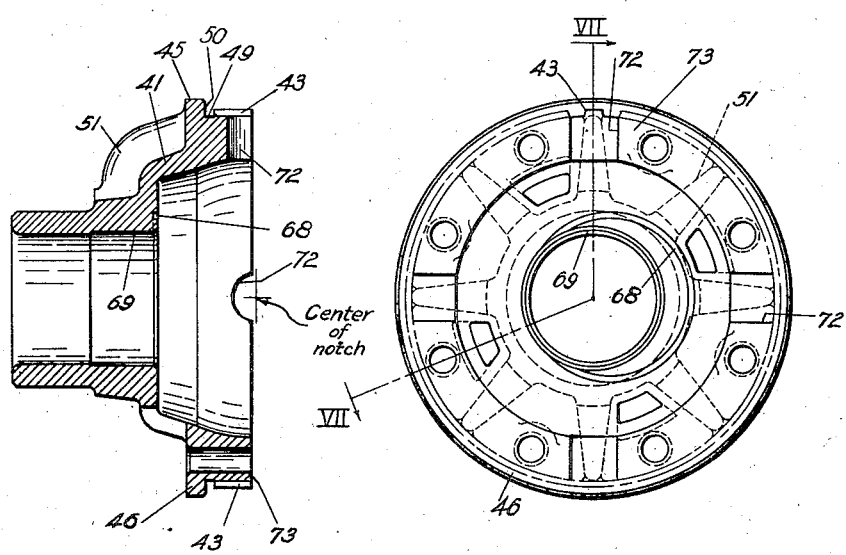
Figure 6 is an enlarged end view of a half of the differential casing looking from the center toward one side.
Figure 7 is an enlarged sectional view of the casing of Figure 6 along the line VII—VII.

Figures 6 and 7 show the special provision for providing lubrication for the rubbing surfaces on the differential casings 41. An eccentric ring groove 68, which communicates with the central bore 69 of the casing, is provided on the inner, vertical surface which is adjacent the driving axle pinions. This groove picks up lubricant and feeds it through holes 71 in the washers 53 to lubricate the flat faces of the gears 36.

Circular notches 72 on abutting faces 73 of the casing 41 are adapted to engage the outer portions of the arms 39 of the differential spider 38. The centers of the notches 72 are located slightly beyond the plane of the face 73 and the radius is slightly greater than the radius of the spider arms 39, with the result that the worm ring wheel will be tightly clamped between flanges 46 and the spider arms will have a snug fit with but very slight clearance, in the notches. The opening between sections of the casing at assembly insures clamping the worm ring wheel between the casing flanges, and at the same time acts as an oil reservoir and insures lubrication of the differential pinions.

Referring to Figures 8, 9 and 10, the differential spider 38 has flat-bottomed depressions 74 on the arms 39 for the purpose of trapping a small quantity of oil to lubricate the differential pinions 37. A chamber 75 on the other end of the pinion 36 aids the lubricant in getting to the spider. A chamber 76 on the pinion 37 forms a small annular reservoir 77 with the respective arm 39 of the differential spider 38. As it rotates into the lower part of the housing, oil will be trapped in the depressions 74 and will insure proper lubrication to the pinions 37.

The axial length of the pinions 37 is such that they do not contact the spider on their extreme inner faces, thus allowing the lubricant to flow in between the chamber and spider arm.

Referring to Figures 13, 14 and 15, the locking member 60 has a projection 78 for engaging the lugs 64 on the adjusting rings 58. A notch 79 in the locking member 60 is adapted to engage one of the lugs 63. The locking member 60 is secured to the jamming nut 62 by means of cap screws 66.

The modified form of differential housing shown in Figures 16 and 17 has heat radiating ribs 81 extending at right angles to the axle housings and parallel to the path of travel of the vehicle. The ribs carry away the heat or friction from the driving mechanism and the lubricant in the housing. The heat generated during long drives becomes very great and it is desirable to carry it from the mechanism. The heat radiating capacity of the ribs is greatly increased by extending them parallel to the direction of travel of the vehicle so as to increase the amount of moving air striking the radiating surfaces.

It will readily appear to those skilled in the art that by this invention an efficient mechanism is provided which may be easily and quickly assembled and dismantled. The invention further provides a mechanism, light in weight, which is strong and compact. It will be noted that the mechanism has provision for proper lubrication of all of its several parts and that the heat generated by the moving parts will be properly carried away.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive axle, a driving member and a driven member of generally circular shape, said driven member comprising two sections, external splines on said sections, a ring gear having internal splines adapted to be engaged by the splines of said driven member by moving said driven member sections axially toward each other, and means provided in one of said members and located adjacent said splines to receive burrs and foreign particles from said splines during the assembly operation.

2. A driven member comprising two parts, each of said parts having external splines, a driving member having internal splines adapted to engage said external splines by sliding the driving member over one of the parts of said driven member and then sliding the other part into said driving member, said internal splines having an annular recess located therein adjacent the juncture of said parts to receive any foreign particles or metal burrs pushed from the splines during the assembling operation.

3. A driven member comprising two parts, each of said parts having external splines, a driving member having internal splines adapted to engage said external splines by sliding the driving member over one of the parts of said driven member, then sliding the other part into said driving member, one of said members having an annular recess located therein adjacent the juncture of said parts to receive any foreign particles or burrs pushed from the splines.

4. A differential mechanism comprising a casing consisting of two oppositely disposed duplicate sections secured together with annular end faces substantially in contact and with continuous circumferential flanges spaced from said faces and together forming a continuous circumferential groove, said sections having radially disposed recesses in their annular end faces that cooperate to form openings in the bottom of said groove for receiving the arms of a differential spider, each section having a continuous series of equidistant splines in its outer surfaces between its flanges and said end face, a ring gear seated in said groove having splines cooperating with the splines of the casing, the depth of the splines of said ring gear being reduced adjacent the juncture of the faces of said sections to provide a space into which burrs and foreign particles from the splines may enter during the assembly operation thereby preventing said burrs and foreign particles from lodging between, and precluding intimate surface engagement of the end faces of said sections.

5. In a differential, a housing for said differential adapted to hold a lubricant, a spider provided with an arm having a depression in its periphery adjacent its inner end, a differential pinion having a chamfer on the inner end thereof and journaled on said spider arm to form with the spider a reservoir that is open to receive lubricant in operation, said depression being so located on said arm as to receive lubricant from said reservoir.

6. In a drive axle, a differential drive mechanism including a ring gear, a differential casing comprising two mating sections surrounded by said ring gear, said sections adapted to be secured together with their annular end faces substantially in contact with each other and with continuous, circumferential flanges spaced from said faces, together forming a continuous circumferential groove adapted to engage the sides of said master gear, said sections having radially disposed semi-circular recesses in their annular end faces that cooperate to form openings in the bottom of said groove, a differential spider having an arm adapted to be engaged by said recesses, the centers of said recesses being displaced slightly beyond said end faces and the radii of said recesses being slightly greater than the radius of said spider arm, whereby said flanges on said casing sections will tightly engage said ring gear.

7. In a differential mechanism, a casing, a differential spider comprising a ring having a plurality of radially extending arms, with differential pinions thereon, said arms engaging said casing, the radial depth of said pinions being substantially less than the radial distance between said spider ring and said casing, driving axle gears journaled in said casing and meshing with said pinions, whereby said pinions are held away from said spider ring to allow lubricant to enter between said pinions and said spider arms, and means provided on said spider arms, for causing lubricant entering between said pinion and spider arms to assume a wedge shaped configuration.

8. In a drive axle, a differential drive mechanism including a worm ring and a worm gear intermeshing with a predetermined speed reduction ratio, a differential casing consisting of two oppositely disposed mating sections secured together with annular end faces substantially in contact and with continuous circumferential flanges spaced from said faces together forming a continuous circumferential groove, said sections having radially disposed recesses in their annular end faces that cooperate to form openings in the bottom of said groove, a four-arm differential spider snugly received in said radially disposed recesses, each section having a continuous series of equidistant, fine splines on its outer periphery between its flange and said end face adapted to engage a corresponding continuous series of equidistant splines on the inner periphery of the worm ring, whereby a substantially continuous drive connection is provided between said worm ring and said differential casing, said worm ring providing concave cylindrical walls adapted to snugly engage the flanges on said casings and form continuous piloting surfaces for resisting radial thrust on said worm wheel.

9. In a differential housing, a bearing carrier in said housing, an anti-friction bearing, means for adjusting said bearing comprising a ring threadedly engaging said carrier, a locking ring nut threadedly engaging said adjusting ring, a series of engaging members on said housing, a series of engaging members on said adjusting ring, and a member adapted to engage at least one of each of said engaging members to prevent relative rotation between said bearing adjusting ring and said housing.

10. In a differential, in sub-combination, a casing having a differential side gear journaled therein, at least one bevel pinion mounted for rotation in said casing and meshing with said side gear, said casing having a plane surface disposed adjacent said side gear and adapted to absorb the thrust set up in the latter during operation, said surface having a groove provided therein that is eccentrically disposed with respect to the axis of said side gear, said side gear being provided with a plane bearing surface which is coextensive with the bearing face of said casing, and a perforated washer disposed between said bearing surfaces for transmitting thrust therebetween and for also permitting lubricant migration.

11. In a differential, a casing, a bevel pinion journaled in said casing, a differential spider engaged by said casing and rotatably supporting a differential bevel gear which meshes with said bevel pinion, a bearing surface provided on said casing for absorbing the thrusts set up by said gears, said surface having an eccentric oil groove provided therein, and a perforated washer between said bearing surface and the first bevel pinion.

12. In a gear mechanism, an annular gear of generally cylindrical form and having a plurality of splines formed on its inner surface, a pair of generally cylindrical supporting members each having a clamping face disposed normal to its axis and having a cylindrical outer surface provided with a plurality of splines of such dimension as to snugly mesh with the splines of said gear, the splines of said supporting members extending to, and terminating flush with the clamping surface of each supporting member; means for securely holding said supporting members in assembled relationship with their clamping faces in surface engagement after they have been axially slid into place within said gear, and means for preventing foreign particles or burrs pushed from said splines during the assembling operation from precluding intimate contact of said clamping faces, said means comprising an annular groove provided in the splines of said gear and defining an annular particle receiving recess adjacent the line of juncture of the clamping faces of said supporting members.

13. In a differential mechanism, a differential carrier comprising a pair of mating sections having plane clamping surfaces disposed substantially in surface engagement with each other, each of said sections having a plurality of cylindrically curved recesses provided therein, the axes of each plurality of said recesses being disposed slightly outwardly of the respective clamping face of the section in which they are provided, and a spider disposed between said sections and having cylindrical arms fitted snugly in said recesses, the radius of each arm being slightly less than the radii of the recesses which receive it.

14. In a gear assembly, an annular gear having a clamping face disposed on either side thereof, and a plurality of splines on its inner surface, a pair of mating, externally splined supporting members upon which said gear is mounted, said members each having a clamping face engaging the clamping faces of said gear and having faces adapted to abut each other, the splines on said gear having a groove provided therein adjacent the junction of the abutting faces of said members, said members also each having a groove provided therein adjacent their clamping faces, said grooves operating to receive foreign particles or burrs pushed from said splines during assembly.

MATHEW B. MORGAN.